(12) United States Patent
Jin et al.

(10) Patent No.: US 10,408,361 B2
(45) Date of Patent: Sep. 10, 2019

(54) SOLENOID VALVE

(71) Applicant: HYUNDAI MOTOR COMPANY, Seoul (KR)

(72) Inventors: Hyun Soo Jin, Jeollabuk-do (KR); Won Ki Park, Jeollabuk-do (KR)

(73) Assignee: HYUNDAI MOTOR COMPANY, Seoul (KR)

( * ) Notice: Subject to any disclaimer, the term of this patent is extended or adjusted under 35 U.S.C. 154(b) by 30 days.

(21) Appl. No.: 15/585,928

(22) Filed: May 3, 2017

(65) Prior Publication Data
US 2018/0156353 A1 Jun. 7, 2018

(30) Foreign Application Priority Data

Dec. 7, 2016 (KR) ........................ 10-2016-0165942

(51) Int. Cl.
| | |
|---|---|
| *F16K 27/02* | (2006.01) |
| *F16K 31/06* | (2006.01) |
| *F16K 31/163* | (2006.01) |
| *F16K 1/22* | (2006.01) |
| *F02D 9/06* | (2006.01) |

(52) U.S. Cl.
CPC ............ *F16K 27/029* (2013.01); *F16K 1/221* (2013.01); *F16K 31/0655* (2013.01); *F16K 31/0696* (2013.01); *F16K 31/1635* (2013.01); *F02D 9/06* (2013.01)

(58) Field of Classification Search
CPC .... F16K 27/029; F16K 31/0696; F16K 1/221; F16K 31/0655; F16K 31/1635; F02D 9/06

USPC ................ 251/64, 129.15; 335/247, 248
See application file for complete search history.

(56) References Cited

U.S. PATENT DOCUMENTS

| | | | | |
|---|---|---|---|---|
| 2,088,358 | A * | 7/1937 | Leland ................. | F16B 13/124 411/44 |
| 2,458,123 | A * | 1/1949 | Wasserlein .......... | F16K 31/0655 137/315.03 |
| 2,888,233 | A * | 5/1959 | Windsor ............... | F16K 31/408 335/248 |
| 3,974,998 | A * | 8/1976 | Wood .................... | B05B 1/3013 251/129.15 |
| 4,592,533 | A * | 6/1986 | Guglielmi ............. | F16K 31/408 251/129.15 |
| 4,901,974 | A * | 2/1990 | Cook ................... | F16K 31/0696 251/129.15 |
| 5,752,689 | A * | 5/1998 | Barkhimer .......... | F16K 31/0665 239/585.4 |
| 6,142,445 | A * | 11/2000 | Kawaguchi ......... | F04B 27/1804 251/129.15 |
| 6,830,232 | B2 * | 12/2004 | Burrola .............. | F02M 25/0836 251/129.15 |

* cited by examiner

*Primary Examiner* — Eric Keasel
(74) *Attorney, Agent, or Firm* — Brinks Gilson & Lione

(57) ABSTRACT

A solenoid valve includes: a solenoid body which includes a plunger mounted movably up and down and a stop member located above the plunger, and a valve body having an orifice which is open and closed as the plunger moves up and down. The stop member includes a first buffer member formed at a contact portion between the plunger and the stop member.

7 Claims, 6 Drawing Sheets

SOLENOID VALVE

CROSS-REFERENCE TO RELATED APPLICATION

This application claims priority to and the benefit of Korean Patent Application No. 10-2016-0165942, filed on Dec. 7, 2016, which is incorporated by reference in its entirety.

FIELD

The present disclosure relates to a solenoid valve.

BACKGROUND

The statements in this section merely provide background information related to the present disclosure and may not constitute prior art.

As generally known to those skilled in the art, a solenoid valve is an electromechanically operated valve. The solenoid valve may be controlled by a current flowing through a solenoid.

The solenoid valve includes a plunger, and the plunger may move as a current is applied to the side of the solenoid, and may be returned to the original position thereof if the current is cut off.

As described above, the plunger makes a contact with other parts during the movement thereof and thus causes contact noise. In addition, as the contact noise is transmitted to the outside through a bracket, another noise (e.g., transmitted noise) may occur together with the contact noise. In particular, as the pressure of a fluid, which is regulated by the solenoid valve, is increased, the contact noise and the transmitted noise may be more increased.

For example, an exhaust brake is mounted between an engine exhaust manifold and a muffler of a vehicle. The solenoid valve is coupled to a cylinder of an actuator which actuates the exhaust brake. As the solenoid valve operates, compressive pressure may be applied into a cylinder of the actuator or the application of the compressive pressure may be cut off.

We have discovered that a driver may be bothered with the noise caused when the solenoid valve is actuated, and the durability of the solenoid valve may be reduced.

SUMMARY

The present disclosure addresses the above-mentioned problems occurring in the prior art while advantages achieved by the prior art are maintained intact.

An aspect of the present disclosure provides a solenoid valve capable of effectively reducing noise caused by the movement of the solenoid valve.

The technical problems to be solved by the present inventive concept are not limited to the aforementioned problems, and any other technical problems not mentioned herein will be clearly understood from the following description by those skilled in the art to which the present disclosure pertains.

According to an aspect of the present disclosure, a solenoid valve may include a solenoid body including a plunger mounted movably up and down and a stop member located above the plunger, and a valve body having an orifice which is opened and closed as the plunger moves up and down. The stop member may include a first buffer member formed at a contact portion between the plunger and the stop member.

The first buffer member may be provided in the stop member by an insert-molding manner.

The first buffer member may include a support portion inserted into the stop member, and an extension portion extending toward a bottom surface of the stop member from the support portion.

The extension portion may include a protrusion portion protruding out of the bottom surface of the stop member.

The stop member may be coupled to a bracket by using a coupling member.

The stop member may include a coupling groove coupled to the coupling member, and a second buffer member may be mounted on a portion of an inner surface of the coupling groove.

The second buffer member may be interposed between a portion of an outer surface of the coupling member and a portion of the inner surface of the coupling groove.

The bracket may include at least one reinforcement rib.

A sleeve may be mounted in the solenoid body, and the stop member may be fixed into an upper end of the sleeve.

At least one compression-receiving groove may be formed in an outer surface of the stop member. Compression-deformation portions, which are formed by compressing portions of an upper end of the sleeve, may be received in the at least one compression-receiving groove, such that the stop member is fixed into the upper end of the sleeve.

The stop member may be formed in an outer surface thereof with a sealing groove into which a sealing member is inserted.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 1:
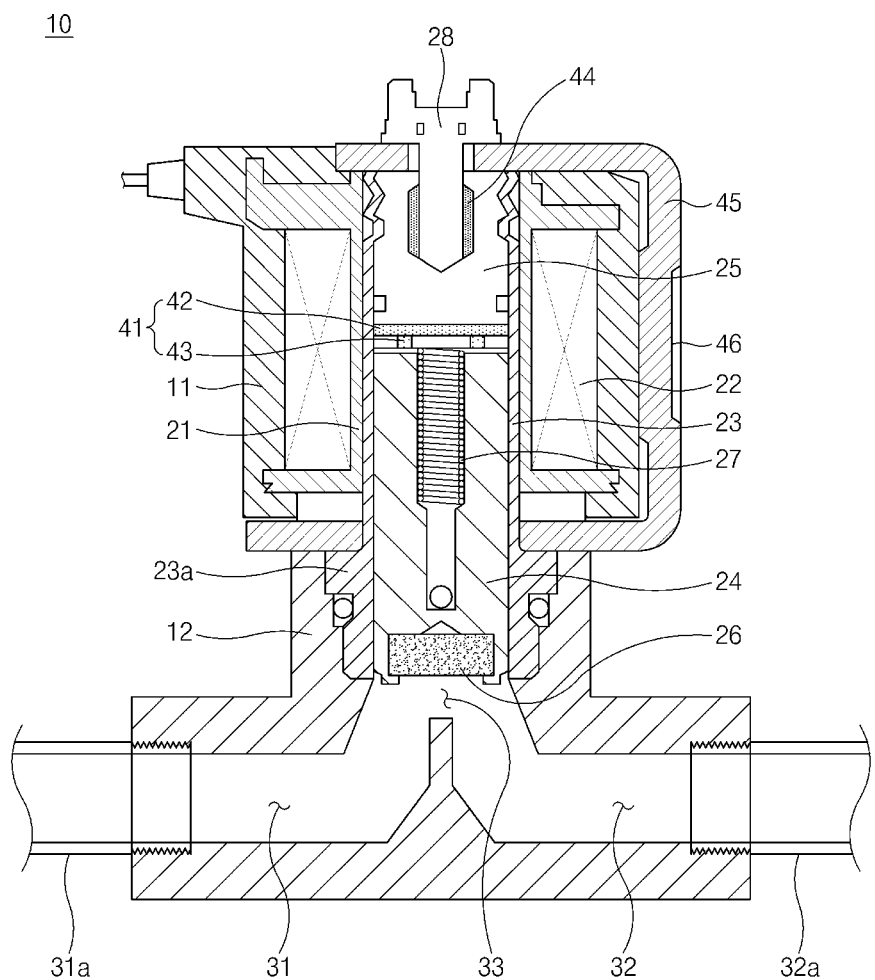
FIG. 1 is a vertical sectional view illustrating a solenoid valve.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

The size of each element and the thickness of a line, which are illustrated in accompanying drawings, may be exaggerated for the purpose of convenience or clarity, and do not reflect an actual size. In addition, the terms employed for the description of the present disclosure are defined based on functions of relevant elements in the present disclosure. Accordingly, the terms may be varied with the intent and the custom of a user and an operator. The terms are defined based on the inventive concept throughout the whole specification.

Referring to FIG. 1, as one form of the present disclosure, a solenoid valve 10 may include a solenoid body 11, and a valve body 12 coupled to the solenoid body 11.

The solenoid body 11 may be mounted therein with a bobbin 21, and a coil 22 may be wound around the bobbin 21.

The bobbin 21 may be mounted therein with a sleeve 23, and a plunger 24 may be movably mounted in the sleeve 23.

A stop member 25 is located above the plunger 24, and the up-and-down movement of the plunger 24 may be stopped by the stop member 25. The stop member 25 may be mounted fixedly into an upper end of the sleeve 23. For example, as an outer surface of the upper end of the sleeve 23 is compressed, the stop member 25 may be fixed into the upper end of the sleeve 23.

A bracket 45 may be mounted on the solenoid valve 11 through a coupling member 28. The coupling member 28 is coupled to an upper end of the stop member 25, thereby coupling the bracket 35 to the stop member 25.

A valve member 26 is inserted into a lower portion of the plunger 24. The valve member 26 may close or open an orifice 33 of the valve body 12. The plunger 24 moves toward the stop member 25 as a current is applied to the coil 22. Accordingly, the valve member 26 may be moved to a position for opening the orifice 33 of the valve body 12.

A spring 27 may be interposed between the plunger 24 and the stop member 25. In one form, the plunger 24 may be formed therein with a groove, and a portion of the spring 27 may be received into the groove of the plunger 24. An upper end of the spring 27 may be supported by the stop member 25, and a lower end of the spring 27 may be supported by the groove of the plunger 24. The plunger 24 may be returned to a position for closing the orifice 33 of the valve body 12 by the spring 27.

A coupling portion 23a is formed at a lower end of the sleeve 23 and protrudes out of the solenoid body 11. The coupling portion 23a may be provided in the form of sealing the valve body 12.

The valve body 12 may have an inlet 31 into which a fluid is introduced, an outlet 32 from which the fluid is withdrawn, and the orifice 33 interposed between the inlet 31 and the outlet 32.

The inlet 31 may be connected to an inlet tube 31a, the outlet 32 may be connected to an outlet tube 32a, and the orifice 33 may be open or closed by the valve member 26.

The stop member 25 may include a first buffer member 41 formed of a material, such as a rubber, having an impact absorbing property. The first buffer member 41 may be provided inside a lower portion of the stop member 25 making contact with the plunger 24. The first buffer member 41 may reduce or suppress the contact noise caused when the plunger 24 contacts with the stop member 25.

Figure 2:
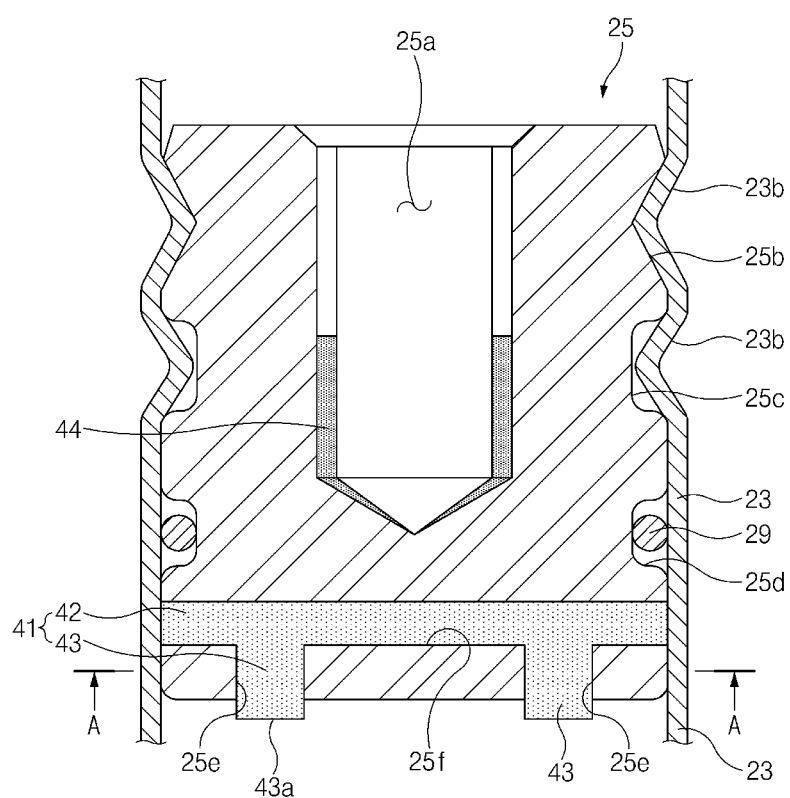
FIG. 2 is a vertical sectional view illustrating a stop member of the solenoid valve.

Referring to FIG. 2, the stop member 25 may be formed of metal having specific stiffness or a non-metallic material. The stop member 25 may be provided inside a lower portion thereof with cavities 25e and 25f in which the first buffer member 41 is received. The first buffer member 41 may be formed integrally with the cavities 25e and 25f of the stop member 25 through an insert-molding manner.

The first buffer member 41 may include a support portion 42 inserted into the cavity 25f of the stop member 25 and a plurality of extension portions 43 inserted into the cavity 25e of the stop member 25.

The support portion 42 may be formed at a lower portion of the stop member 25 and may extend in a horizontal direction. The extension portions 43 may be formed at the lower portion of the stop member 25 and may extend in a vertical direction. The extension portions 43 may extend from the support portion 42 toward a bottom surface of the stop member 25. The first buffer member 41 may absorb or buffer impact in vertical and horizontal directions when an upper end of the plunger 24 contacts with the stop member 25, thereby reducing or suppressing the contact noise.

Figure 3:
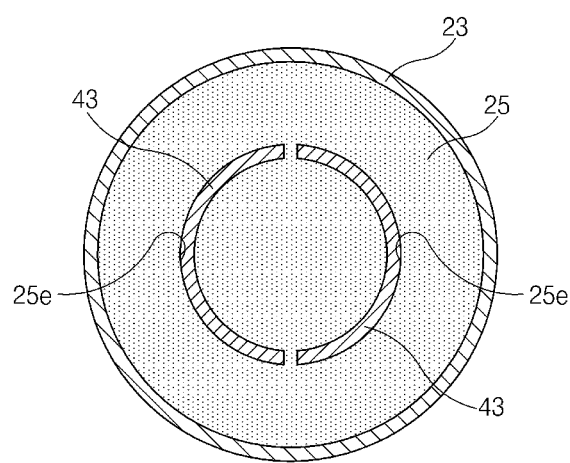
FIG. 3 is a sectional view taken along line A-A of FIG. 2.

Meanwhile, as illustrated in FIG. 3, at least two cavities 25e may be circumferentially spaced apart from each other. The extension portions 43 may be formed in the cavities 25e, respectively. Accordingly, the extension portions 43 are circumferentially spaced apart from each other in an inner portion of the stop member 25 near to a lower end of the stop member 25.

As described above, according to the present disclosure, when the plunger 24 contacts with the stop member 25, the first buffer member 41 provided in the stop member 25 may absorb or buffer the contact noise, thereby more reducing noise.

As illustrated in FIG. 2, the extension portion 43 may have a protrusion portion 43a protruding out of a bottom surface of the stop member 25. Accordingly, the plunger 24 may be inhibited or prevented from directly contacting the stop member 25, thereby more reducing the noise.

The stop member 25 may be provided in the upper portion thereof with a coupling groove 25a to which the coupling member 28 is coupled, and the coupling groove 25a may be formed therein with a thread portion.

A second buffer member 44 may be circumferentially provided on an inner surface of at least a portion of the coupling groove 25a formed in the stop member 25.

In one form, the second buffer member 44 may be interposed between a portion of the inner surface of the coupling groove 25a and a portion of an outer surface of the coupling member 28, thereby effectively suppressing the transmitted noise caused as the contact noise caused by the plunger 24 and the stop member 25 is transmitted to the bracket 45.

At least one of compression-receiving grooves 25b and 25c may be circumferentially formed in an outer surface of the stop member 25. Accordingly, compression-deformation portions 23b, which are formed by compressing portions of an upper end of the sleeve 23, may be received in the compression-receiving grooves 25b and 25c, respectively. The stop member 25 may be securely fixed into the upper end of the sleeve 23 by the compression-deformation portions 23b and the compression-receiving grooves 25b and 25c.

In addition, the stop member 25 may be formed in the outer surface thereof with a sealing groove 25d into which a sealing member 29, such as an O-ring, is inserted. The stop member 25 may be mounted into the upper end of the sleeve 23 while the stop member 25 is being sealed with the sealing member 29.

Figure 4:
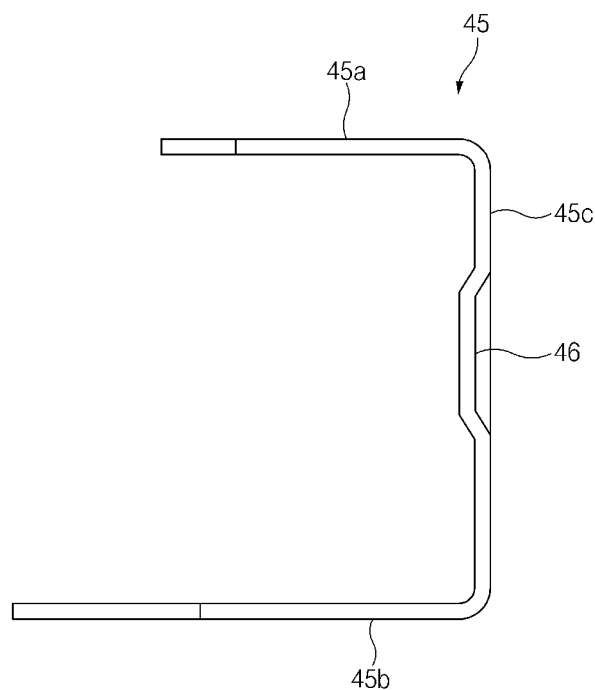
FIG. 4 is a side view illustrating a bracket of the solenoid valve.
Figure 5:
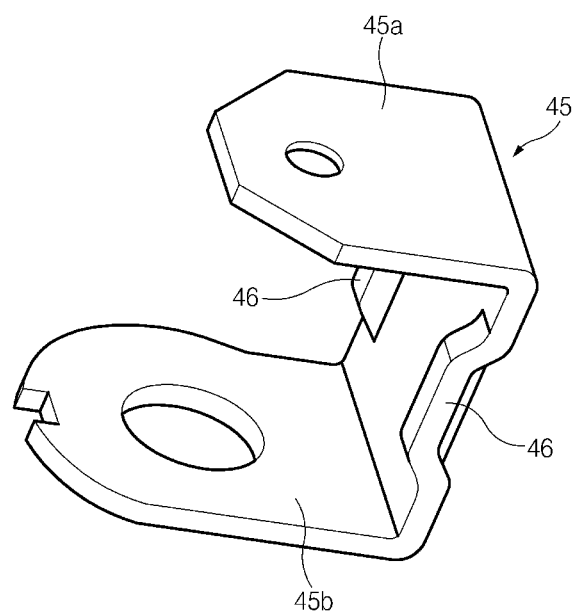
FIG. 5 is a perspective view illustrating the bracket of the solenoid valve.

Referring to FIGS. 4 and 5, the bracket 45 may have a first mounting portion 45a mounted on an upper end of the solenoid body 11, a second mounting portion 45b mounted on a lower end of the solenoid body 11, and a connection portion 45c which connects the first mounting portion 45a with the second mounting portion 45b.

At least one reinforcement rib 46 may be provided in a bent form at the connection portion 45c of the bracket 45 to reinforce stiffness. As described above, as the reinforcement rib 46 is formed at the bracket 45, the resonance frequency of the bracket 45 may be increased, thereby reducing noise caused by the contact noise between the plunger 24 and the stop member 25.

The bracket 45 may be welded to a frame of a system mounted therein with the solenoid valve 10 or another bracket mounted on the frame. Alternatively, the bracket 45 may be coupled to the frame of the system mounted therein with the solenoid valve 10 or another bracket mounted on the frame by using a coupling member.

Figure 6:
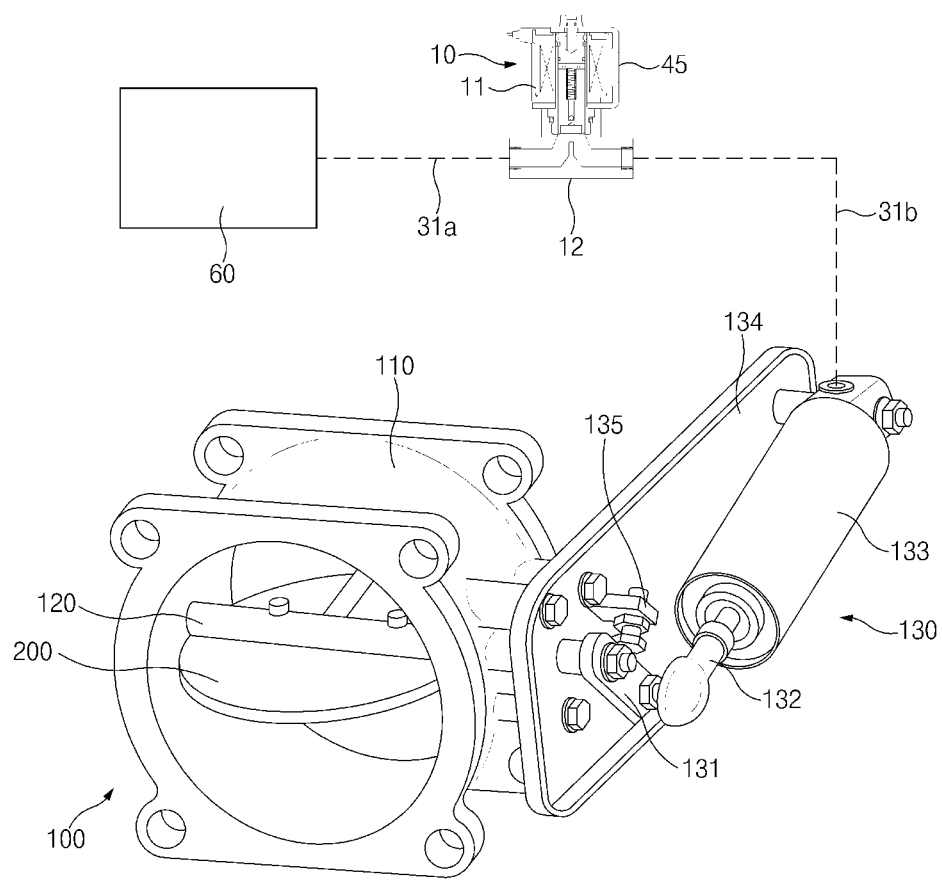
FIG. 6 is a view illustrating the structure in which the solenoid valve is coupled to an actuator of an exhaust brake.

FIG. 6 is a view illustrating the state that the solenoid valve 10 is applied to the exhaust brake 10, according to the present disclosure.

The exhaust brake 100 may include a valve housing 110 mounted in an intermediate portion of an exhaust pipe, which connects the exhaust manifold of the engine with the muffler, a butterfly gate 200, which selectively opens or closes the passage of the valve housing 111, and an actuator 130 which rotates a spindle 120 of the butterfly gate 200.

A mounting plate 134 may be fixed to one side of the valve housing 110, and the actuator 130 may be mounted on the mounting plate 134.

The actuator 130 has a link 131 coupled to the spindle 120 and a cylinder 133 coupled to the link 131.

One side of the link 131 is coupled to the spindle 120, and an opposite side of the link 131 is coupled to a rod 132 of the cylinder 133.

The link 131 and the cylinder 133 may be mounted on the mounting plate 134, and the mounting plate 134 may be mounted thereon with a rotation restriction member 135 which restricts the rotation of the link 131.

In another form of the present disclosure, the solenoid valve 10 may be coupled to the cylinder 133 of the actuator 130.

The valve body 12 of the solenoid valve 10 may be coupled between a fluid tank 60, which has a fluid stored therein to actuate the cylinder 133, and the cylinder 133. The solenoid valve 10 may supply the fluid to the cylinder 133 of the actuator 130 or may cut off the supply of the fluid to the cylinder 133.

As described above, the contact noise, which is caused when the plunger contacts the stop member and the plunger is moved, and the transmitted noise, which is caused as the contact noise is transmitted to the outside through the bracket, may be completely suppressed.

Although the present disclosure has been described with reference to exemplary forms and the accompanying drawings, the present disclosure is not limited thereto, but may be variously modified and altered by those skilled in the art to which the present disclosure pertains without departing from the spirit and scope of the present disclosure.

What is claimed is:

1. A solenoid valve comprising:
    a solenoid body including a plunger mounted movably up and down, and a stop member located above the plunger;
    a sleeve mounted in the solenoid body;
    a valve body having an orifice which is opened and closed as the plunger moves up and down; and
    a first buffer member formed at a contact portion between the plunger and the stop member,
    wherein the stop member is fixed into an upper end of the sleeve, a bracket is coupled to the stop member by using a coupling member, and the stop member includes a coupling groove coupled to the coupling member,
    wherein a second buffer member is mounted on a portion of an inner surface of the coupling groove,
    wherein the first buffer member includes:
        a support portion inserted into the stop member; and
        an extension portion extending toward a bottom surface of the stop member from the support portion, and
        wherein the support portion is perpendicular to the extension portion.

2. The solenoid valve of claim 1, wherein the first buffer member is provided in the stop member by an insert-molding manner.

3. The solenoid valve of claim 1, wherein the extension portion includes:
    a protrusion portion protruding out of the bottom surface of the stop member.

4. The solenoid valve of claim 1, wherein the second buffer member is interposed between a portion of an outer surface of the coupling member and a portion of the inner surface of the coupling groove.

5. The solenoid valve of claim 1, wherein the bracket includes at least one reinforcement rib.

6. The solenoid valve of claim 1, wherein at least one compression-receiving groove is formed in an outer surface of the stop member, and
    wherein compression-deformation portions, which are formed by compressing portions of the upper end of the sleeve, are received in the at least one compression-receiving groove, such that the stop member is fixed into the upper end of the sleeve.

7. The solenoid valve of claim 1, wherein a sealing groove, into which a sealing member is inserted, is formed in an outer surface of the stop member.

* * * * *